(12) United States Patent  
Swaggert

(10) Patent No.: US 7,823,903 B2  
(45) Date of Patent: Nov. 2, 2010

(54) PORTABLE DRAFT BAR ASSEMBLY

(76) Inventor: Patrick J. Swaggert, 22501 Drexel Ave., Jordan, MN (US) 55352

( * ) Notice: Subject to any disclaimer, the term of this patent is extended or adjusted under 35 U.S.C. 154(b) by 264 days.

(21) Appl. No.: 12/059,921

(22) Filed: Mar. 31, 2008

(65) Prior Publication Data

US 2008/0238033 A1    Oct. 2, 2008

Related U.S. Application Data

(60) Provisional application No. 60/908,944, filed on Mar. 29, 2007.

(51) Int. Cl.
*B60D 1/14* (2006.01)
(52) U.S. Cl. .................. 280/495; 280/481; 280/292; 280/491.2; 280/482
(58) Field of Classification Search ............. 280/495, 280/481, 292, 491.2, 482
See application file for complete search history.

(56) References Cited

U.S. PATENT DOCUMENTS

| | | | | |
|---|---|---|---|---|
| 5,097,609 A | * | 3/1992 | Swaggert | ............ 37/403 |
| 5,570,897 A | * | 11/1996 | Wass | ............ 280/495 |
| 5,833,008 A | * | 11/1998 | Reed et al. | ............ 171/141 |
| 6,487,799 B2 | * | 12/2002 | Burk | ............ 37/403 |
| 7,065,840 B2 | * | 6/2006 | Profit | ............ 24/71 TD |
| 7,267,354 B2 | * | 9/2007 | Cunningham et al. | ....... 280/480 |

\* cited by examiner

*Primary Examiner*—Lesley Morris
*Assistant Examiner*—Michael R Stabley
(74) *Attorney, Agent, or Firm*—Dicke, Billig & Czaja, PLLC

(57) ABSTRACT

A portable draft bar assembly including an end bracket configured to be mounted to a plurality of bucket attachment types of various machinery, and a main bar having a first end configured to be selectively coupled to the end bracket and a second end configured to receive and retain one of a plurality of hitch assembly types. An anchor bracket is configured to be selectively coupled to the main bar at one of a plurality of positions, and an end clamp is slideably coupled to the main bar between second end and the anchor bracket and includes an angled channel. A binder assembly is coupled between the anchor bracket and end clamp, wherein the anchor bracket is selectively coupled to a selected one of the plurality of positions so that the angled channel at least partially engages a leading edge of a bucket to which the end bracket is mounted, and wherein the binder assembly is configured to draw the end clamp and anchor bracket together to wedge and secure the angled channel against the leading edge of the bucket.

17 Claims, 9 Drawing Sheets

PORTABLE DRAFT BAR ASSEMBLY

CROSS-REFERENCE TO RELATED APPLICATIONS

This Utility patent application claims benefit of Provisional Patent Application 60/908,944, filed Mar. 29, 2007, incorporated herein by reference.

BACKGROUND OF THE INVENTION

Construction and farm equipment, such as skid steers, front end loaders, and tractors, for example, are often fitted with buckets for performing various tasks such as loading and grading soil, for example. Often, particularly on construction sites, trailers and other equipment of varying types and sizes need to be moved from place to place. If proper moving equipment, such as truck having a trailer hitch, is not available, workers sometimes attempt to move the equipment by hand or attempt to push or pull them in some fashion with other construction equipment, such as skid steers, not equipped for the task. Attempting to move objects in this fashion can be dangerous to workers and property. Even if suitable equipment is available, such as a truck, construction sites are often muddy or otherwise inaccessible to such vehicles.

SUMMARY OF THE INVENTION

In one embodiment, a portable draft bar assembly is provided which is configured for temporary mounting to bucket attachments of various machinery such as tractors, skid steers, front end loaders, and other earth moving equipment, to name a few.

According to one embodiment, the portable draft bar assembly includes an end bracket configured to be mounted to a plurality of bucket attachment types of various machinery, and a main bar having a first end configured to be selectively coupled to the end bracket and a second end configured to receive and retain one of a plurality of hitch assembly types. An anchor bracket is configured to be selectively coupled to the main bar at one of a plurality of positions, and an end clamp is slideably coupled to the main bar between second end and the anchor bracket and includes an angled channel. A binder assembly is coupled between the anchor bracket and end clamp, wherein the anchor bracket is selectively coupled to a selected one of the plurality of positions so that the angled channel at least partially engages a leading edge of a bucket to which the end bracket is mounted, and wherein the binder assembly is configured to draw the end clamp and anchor bracket together to wedge and secure the angled channel against the leading edge of the bucket.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention provides a portable or detachable draft bar assembly configured for temporary mounting to bucket attachments of various machinery such as tractors, skid steers, front end loaders, and other earth moving equipment, to name a few. As will be described in greater detail below, once mounted on a bucket, the detachable draft bar assembly is configured to receive and accommodate a variety of hitch attachments (e.g. balls, pintles, clevis pins) for coupling to an moving a variety of items such as trailers, construction equipment, and farm implements, for example.

Figure 1:
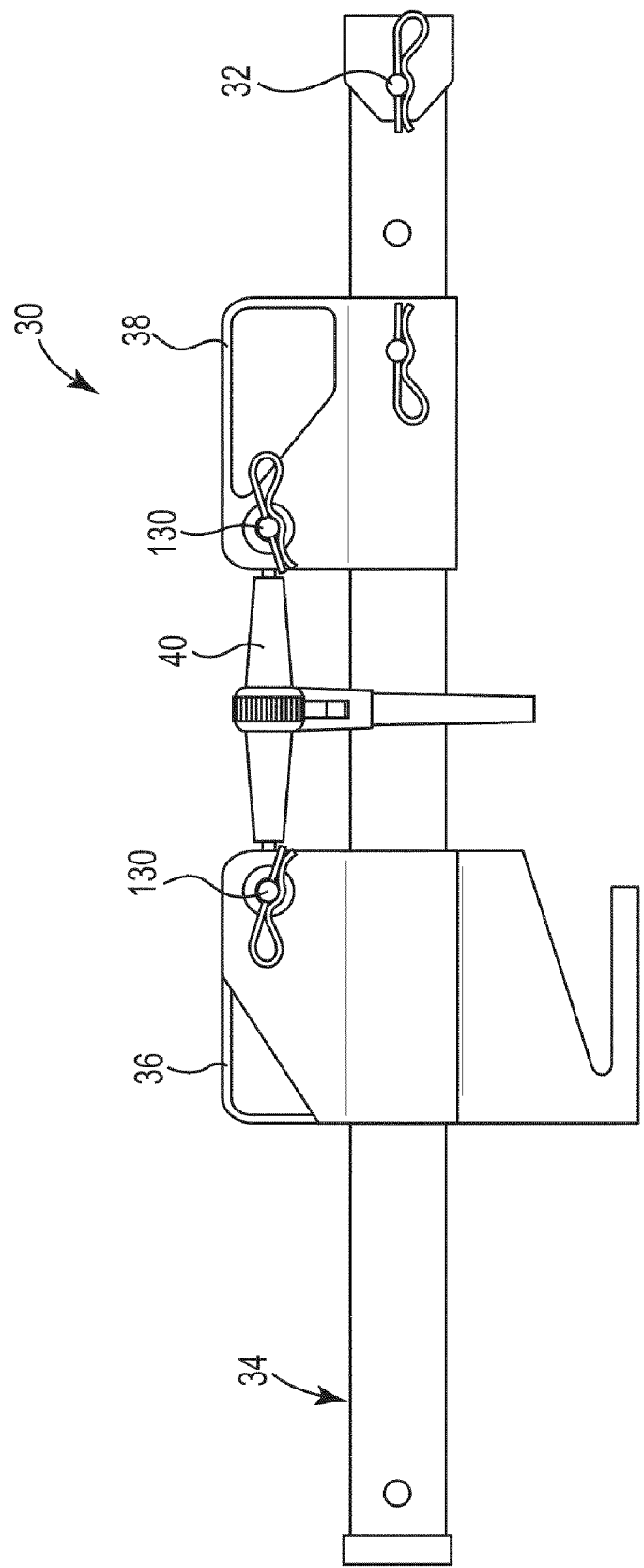
FIG. 1 generally illustrates a draft bar assembly according to one embodiment.

FIG. 1 is a perspective view illustrating a detachable draft bar assembly 30 according to one embodiment. Draft bar assembly 30 includes an end bracket 32, a main bar 34, an edge clamp assembly 36, an anchor bracket assembly 38, and a binder assembly 40, which are illustrated in greater detail below by FIGS. 2-4.

Figure 2:
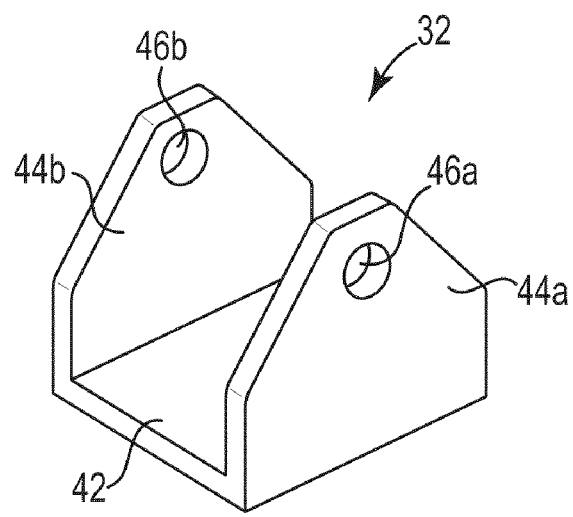
FIG. 2 illustrates one embodiment of an end bracket of the draft bar assembly of FIG. 1.
Figure 3:
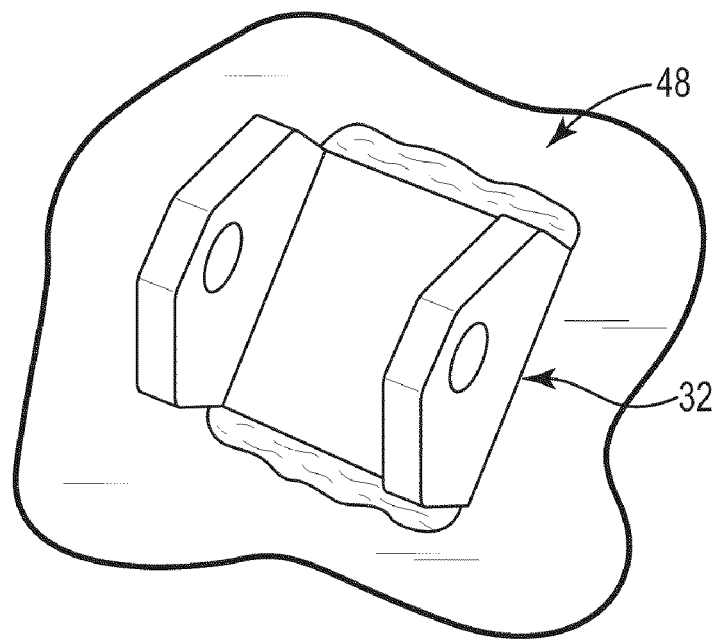
FIG. 3 illustrates the end bracket of FIG. 2 in an installed position in a bucket.

FIG. 2 is a perspective view illustrating end bracket 32 according to one embodiment. In one embodiment, end bracket is U-shaped with a back plate 42 and a pair of side flanges 44a and 44b, respectively including apertures 46a and 46b. As will be described in greater detail below, end bracket 32 is configured to be mounted or attached to a bucket attachment of a piece of heavy equipment such as a skid steer or an end loader, for example. In one embodiment, as illustrated by FIG. 3, end bracket 32 is mounted to a bucket 48 by welding back plate 42 to a rear or horizontal portion of a bucket, sometimes referred to as the bucket "heel" (see also FIG. 10). In one embodiment, end bracket 32 is configured to be detachably mounted to a bucket, such as by bolting, in lieu of being permanently attached, such as by welding.

Figure 4:
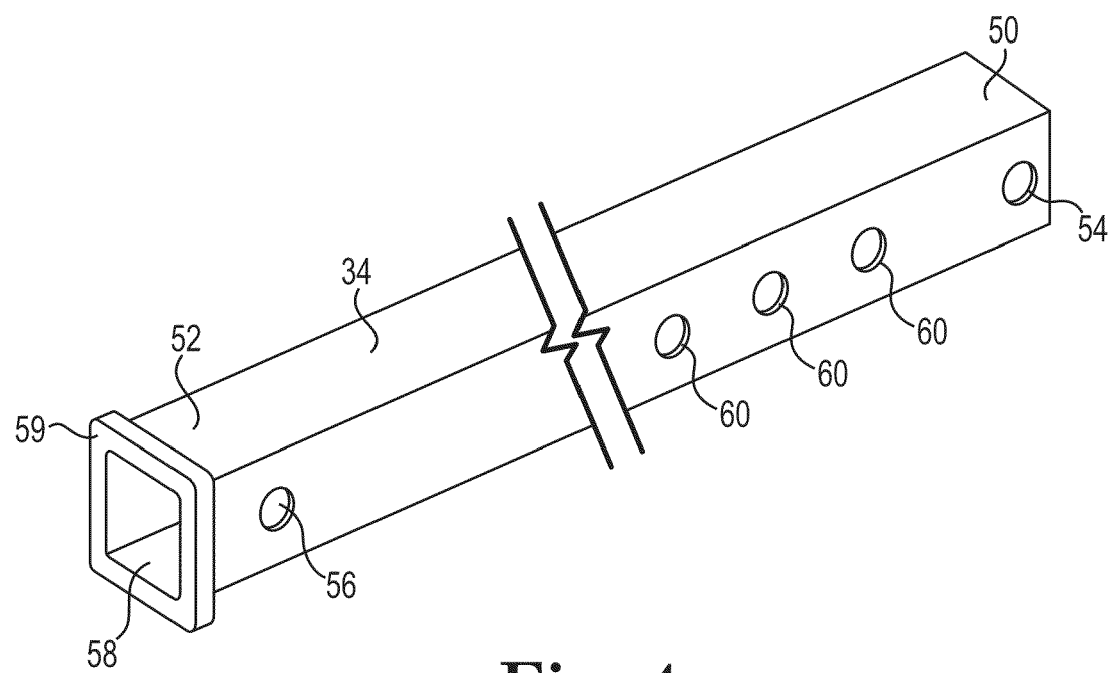
FIG. 4 illustrates one embodiment of a main bar of the draft bar assembly of FIG. 1.

FIG. 4 is a perspective view illustrating main bar 34 according to one embodiment. In one embodiment, as illustrated by FIG. 3, main bar 34 comprises a rectangular tubular steel bar. Main bar 34 includes an attachment end 50 and a receiver end 52. Attachment end 50 includes an aperture 54 extending through main bar 34. Receiver end 52 includes an aperture 56, a receiver shaft 58, and a flange 59. A plurality of sets of apertures extend through main bar 34 along a portion of its length, as illustrated at 60, and as described below, provide a plurality of positions at which anchor bracket 38 can be coupled. In one embodiment, the sets of apertures 60 are positioned at equal intervals and provide anchor bracket 38 a desired adjustment range along main bar 34. In one embodiment, a range of 8-inches is provided.

Figure 5A:
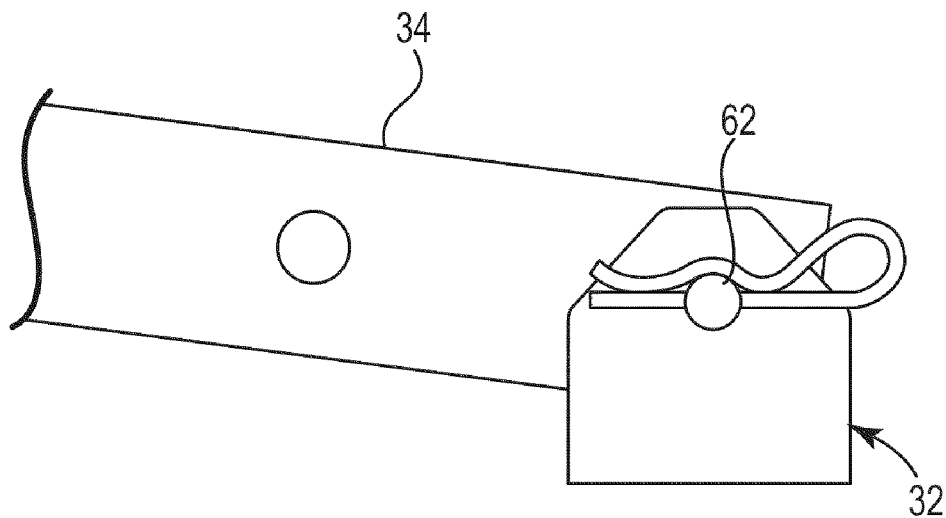
FIGS. 5A and 5B illustrate a main bar of the draft bar assembly of FIG. 1 in an installed position within the end bracket illustrated by FIG. 2.
Figure 5B:
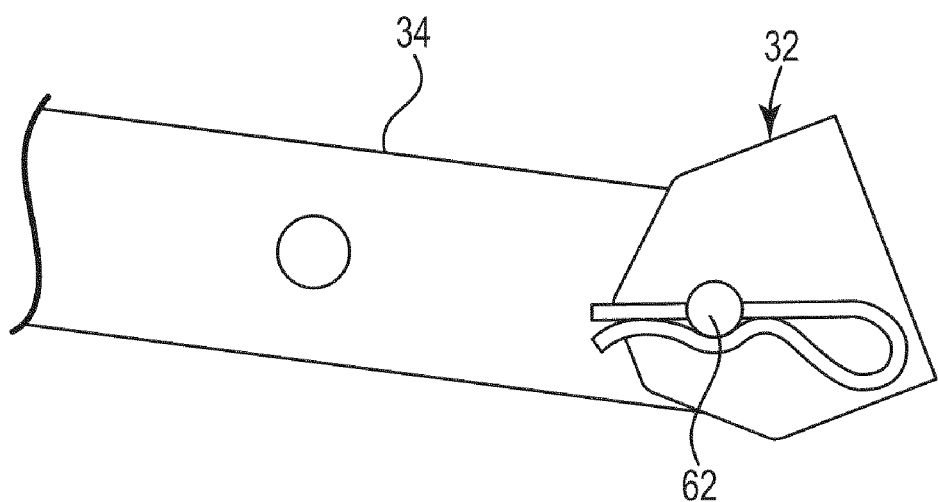

In one embodiment, as illustrated by FIGS. 5A and 5B, main bar 32 is configured to selectively couple to end bracket 32 by positioning attachment end 50 between side flanges 44a, 44b and inserting an anchor pin 62 through apertures 46a and 46b in end bracket 32 and aperture 54 in main bar 34. Main bar 34 is free to rotate within end bracket 32 about anchor pin 62 so as to better enable installation of draft bar assembly 30 within a bucket to which end bracket 32 is attached so as to enable end bracket 32 to be attached in a position or angle best suited for a particular bucket configuration.

Figure 10:
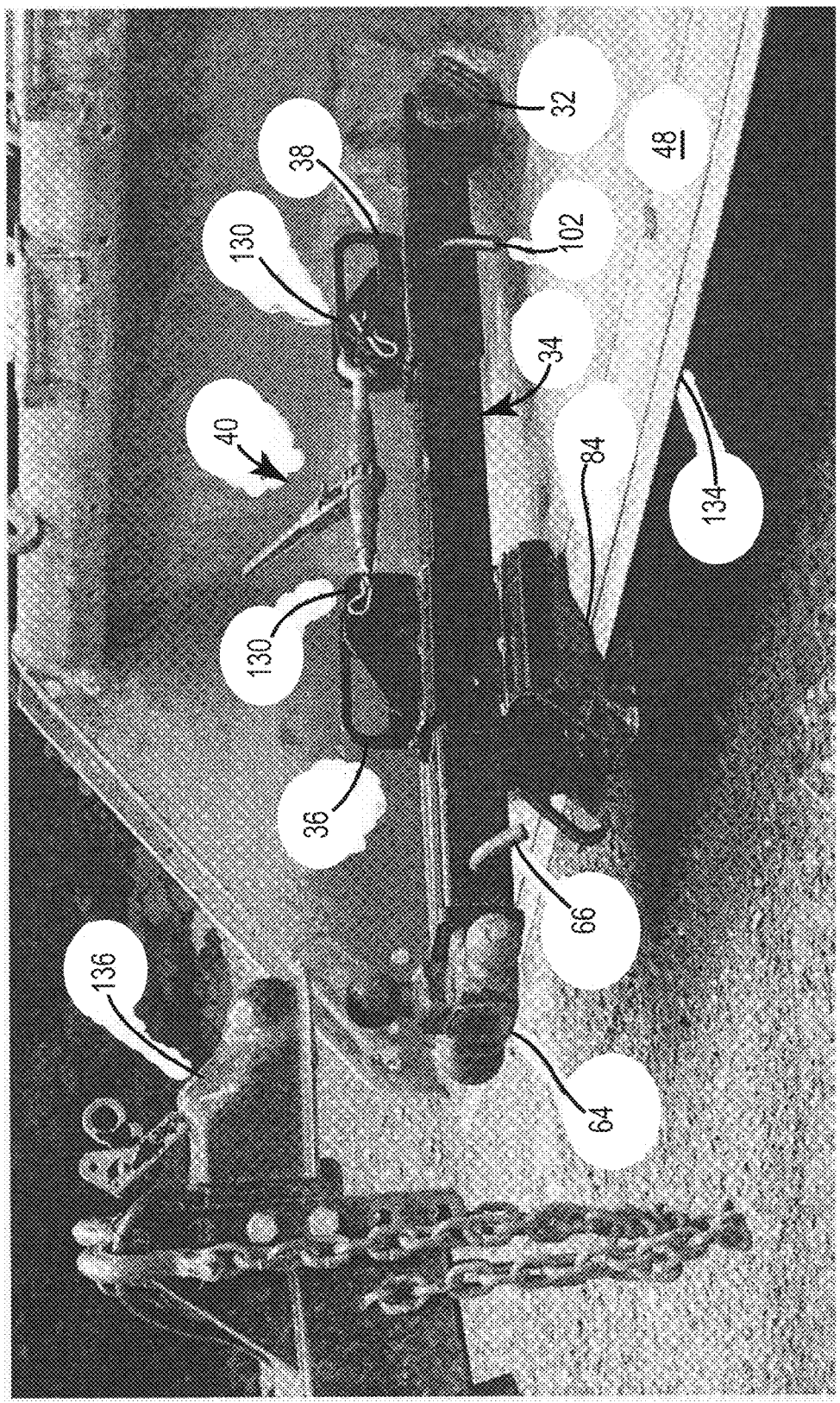
FIG. 10 illustrates the draft bar assembly of FIG. 1 in an installed position on a bucket attachment.

In one embodiment, receiver shaft 58 comprises a 2"×2" shaft configured to receive and retain a variety of standard and other hitch attachments as described above, such as hitch multi-ball hitch attachment 64 illustrated by FIG. 10. A hitch attachment, such as hitch attachment 64, is retained within receiver shaft 58 by inserting a receiver pin 66 through aperture 56 and a corresponding aperture in the hitch attachment (see FIG. 10).

Figure 6:
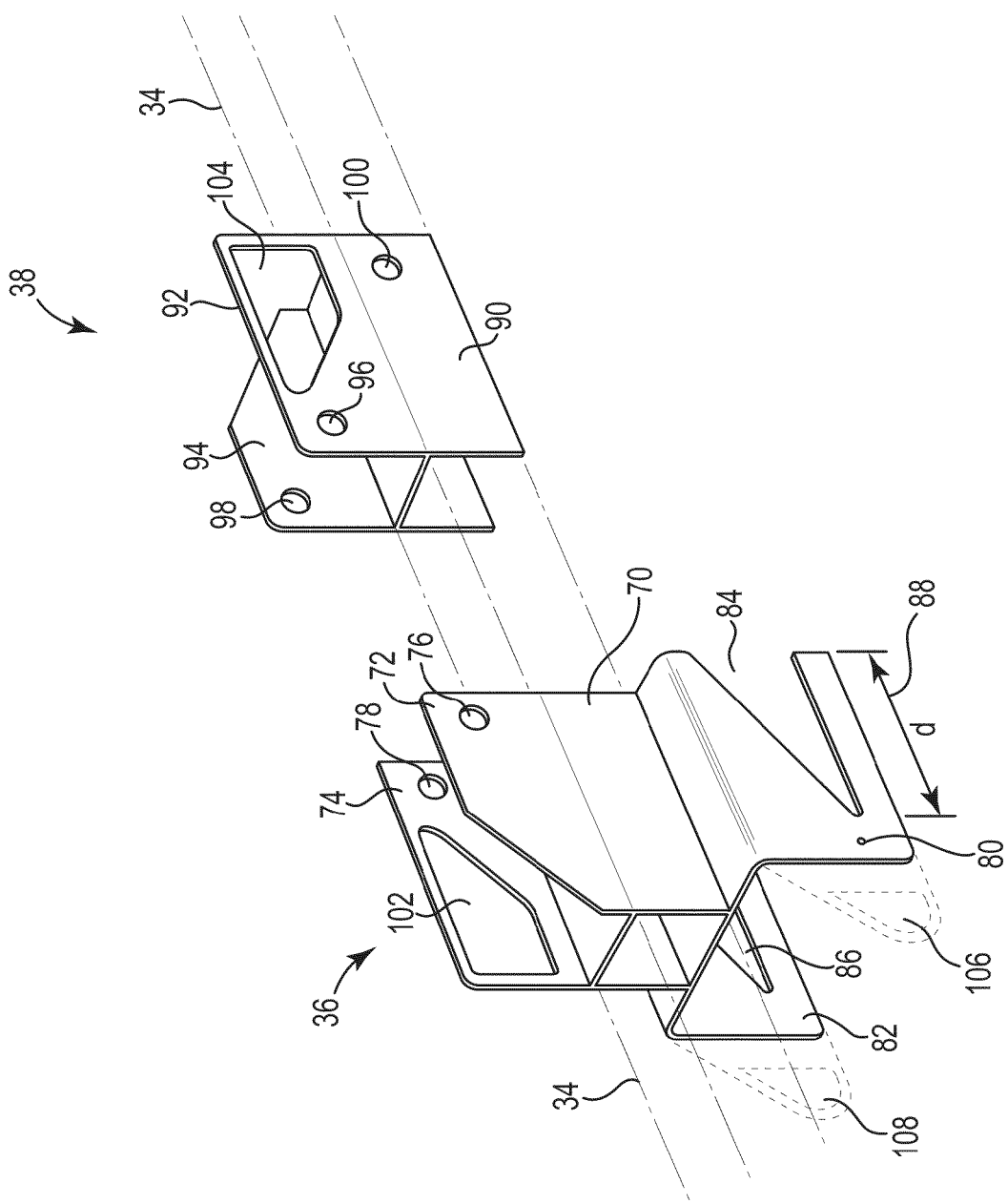
FIG. 6 illustrates embodiments of an end clamp assembly and an anchor bracket assembly of the draft bar assembly of FIG. 1.

FIG. 6 is a perspective view illustrating embodiments of edge clamp assembly 36 and anchor bracket assembly 38. Edge clamp assembly 36 includes a sleeve 70 configured to receive and slide over and along main bar 34 (indicated by the dashed lines in FIG. 6). A pair of flanges 72 and 74 extend from sleeve 70 and respectively include apertures 76 and 78. A pair of flanges 80 and 82 extend from sleeve 70 in a direction opposite flanges 72 and 74 and respectively include tapered, V-shaped or wedge-shaped channels 84 and 86 which together are configured to slide over and receive or engage a front or "cutting" edge of a bucket (see FIG. 10). In one embodiment, channels 84 and 86 have a depth (d) 88 large enough to slide over cutting teeth which may be mounted to the front edge of a bucket.

According to one embodiment, as illustrated by FIG. 6, anchor bracket assembly 38 includes a U-shaped saddle portion 90 configured to sit over and slide along main bar 34. In one embodiment, in lieu of U-shaped saddle portion 90, anchor bracket assembly 38 employs a sleeve, similar to sleeve 70 of edge clamp assembly 36, to slide over and ride along main bar 34. A pair of flanges 90 and 92 extend from saddle portion 46 and respectively include apertures 96 and 98. Saddle portion 90 includes an aperture 100 which, as will be described in greater detail below, is configured to receiver a saddle pin 102 (see FIG. 10) which is configured to slide through aperture 100 and one of the apertures of the set of apertures 60 of main bar 34 (see FIG. 4) so as to secure anchor bracket assembly 38 to main bar 34.

Figure 7:
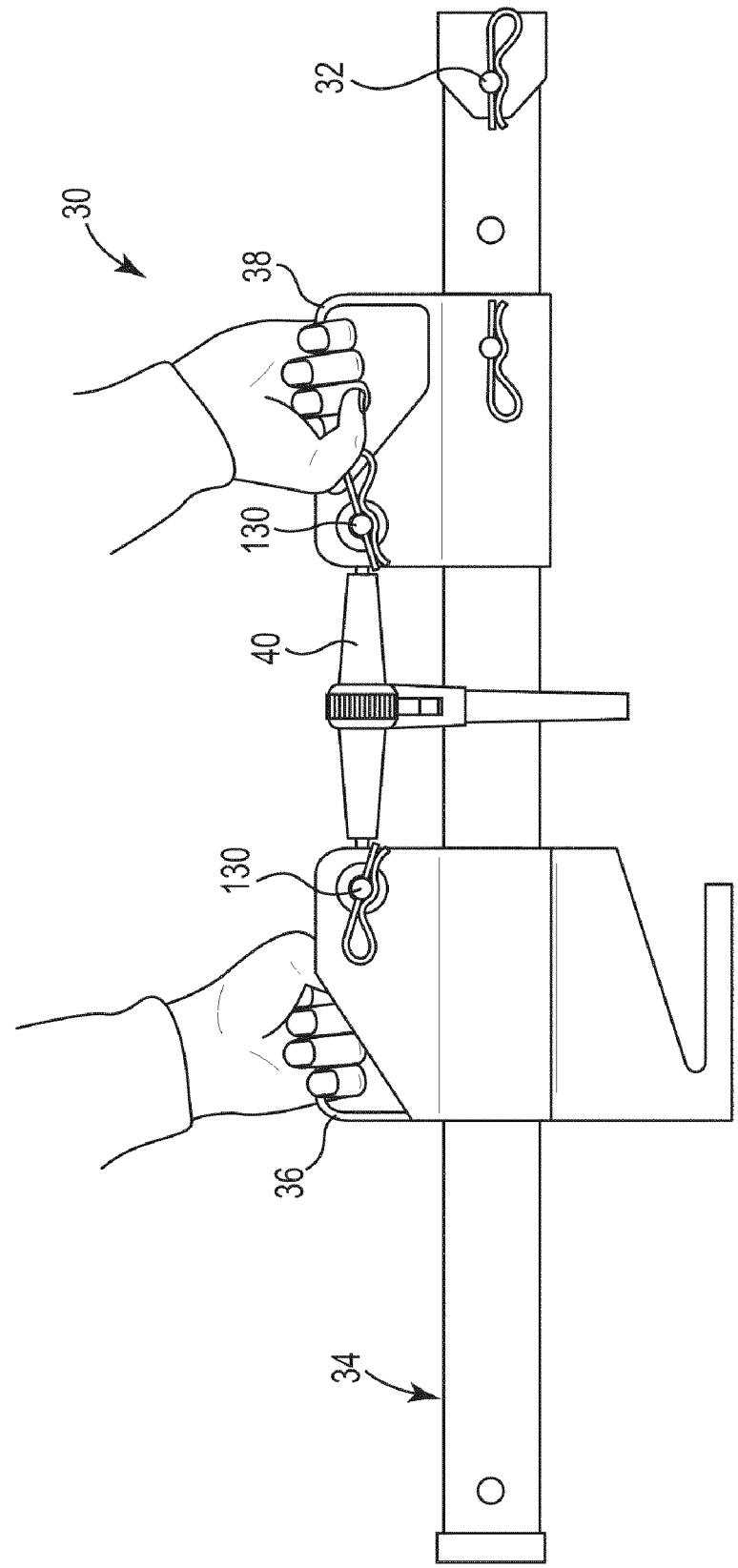
FIG. 7 illustrates carrying handles on an end clamp assembly and anchor bracket assembly according to one embodiment.

In one embodiment, edge clamp assembly 36 and anchor bracket assembly 38 respectively include carrying handles 102 and 104 through flanges 74 and 92 to enable draft bar assembly 30 to be easily carried, as illustrated by FIG. 7. In one embodiment, draft bar assembly weighs approximately 52 pounds so as to be easily lifted and transported. In one embodiment, edge claim assembly 36 further includes extensions from flanges 80 and 82 which include safety chain attachment points 106 and 108 (as illustrated by dashed lines in FIG. 6).

Figure 8:
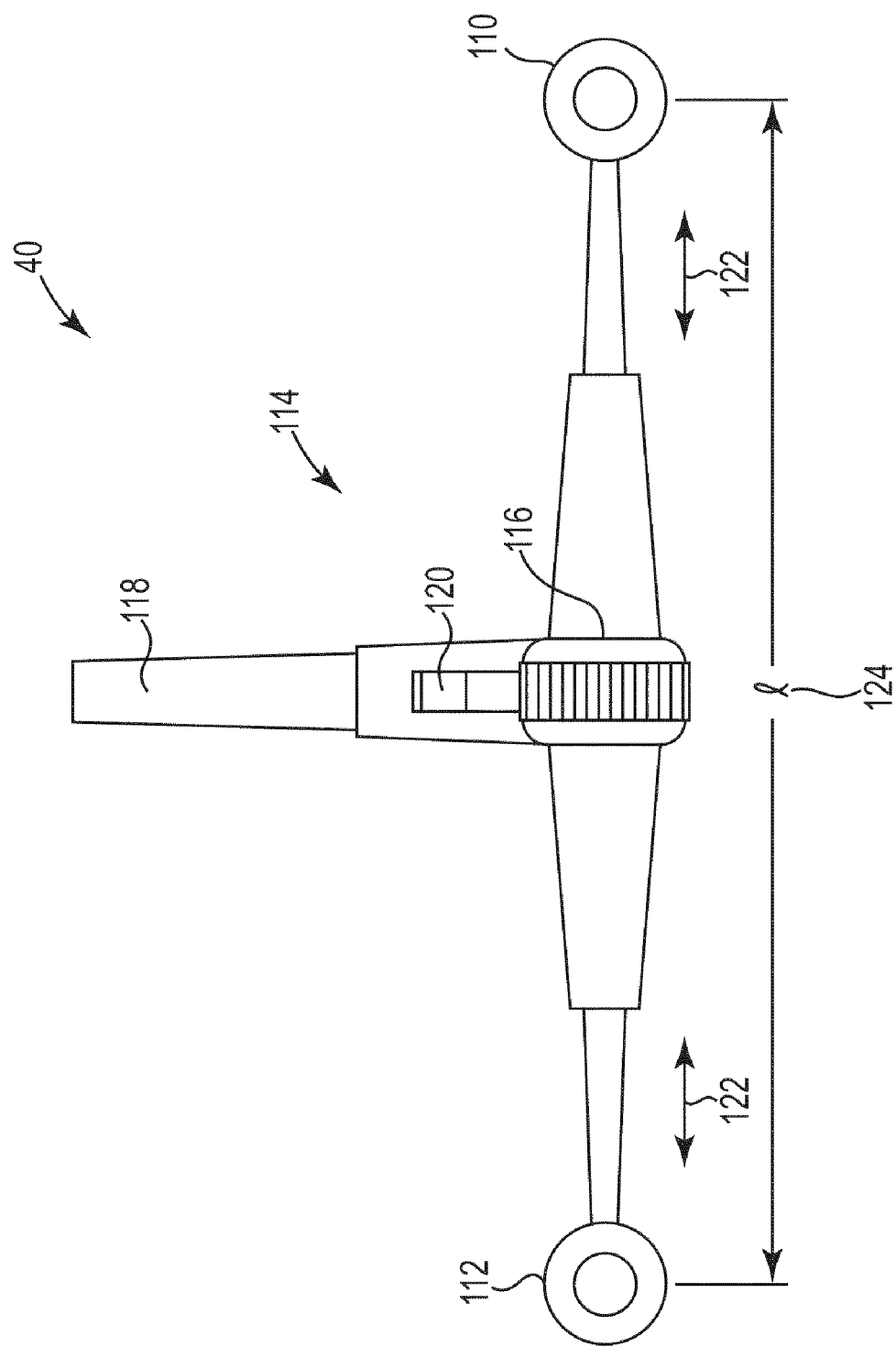
FIG. 8 illustrates one embodiment of a binder assembly of the draft bar assembly of FIG. 1.

FIG. 8 is diagram generally illustrating one embodiment of binder assembly 40 suitable for use with draft bar assembly 30. Binder assembly 40 of FIG. 8 is an example of what is commonly referred to as a load binder ratchet. According to such an embodiment, binder assembly 40 includes a pair of eyebolts 110 and 112 coupled to a ratchet assembly 114. Ratchet assembly 114 includes a gear mechanism 116, a ratchet handle 118 coupled to gear mechanism 116, and a directional toggle switch 120. In operation, a user operates ratchet handle 118 to engage and actuate gear mechanism 116 to drive eyebolts 110 and 112 toward and away from gear mechanism 166, as indicated by directional arrows 122, depending on the position of directional toggle switch 120. In one embodiment, binder assembly 40 is configured to adjust a distance or length (1) 124 between eyebolts 110 and 112 over a range of 5-inches.

In one embodiment, with further reference to FIGS. 1, 6, and 10, binder assembly 40 is coupled between edge clamp assembly 36 and anchor bracket assembly 38 via binder assembly pins 130 which are configured to insert through apertures 76 and 78 of edge clamp assembly 36 via eyebolt 112 and through apertures 96 and 98 of anchor bracket assembly 38 via eyebolt 110. Although described in the above embodiment as being a load binder ratchet, it is noted that binder assembly 40 may comprise any number of mechanisms or assemblies suitable for pulling or drawing edge clamp assembly 36 and anchor bracket assembly 38 toward one another, such as a turnbuckle assembly, for example.

Figure 9:
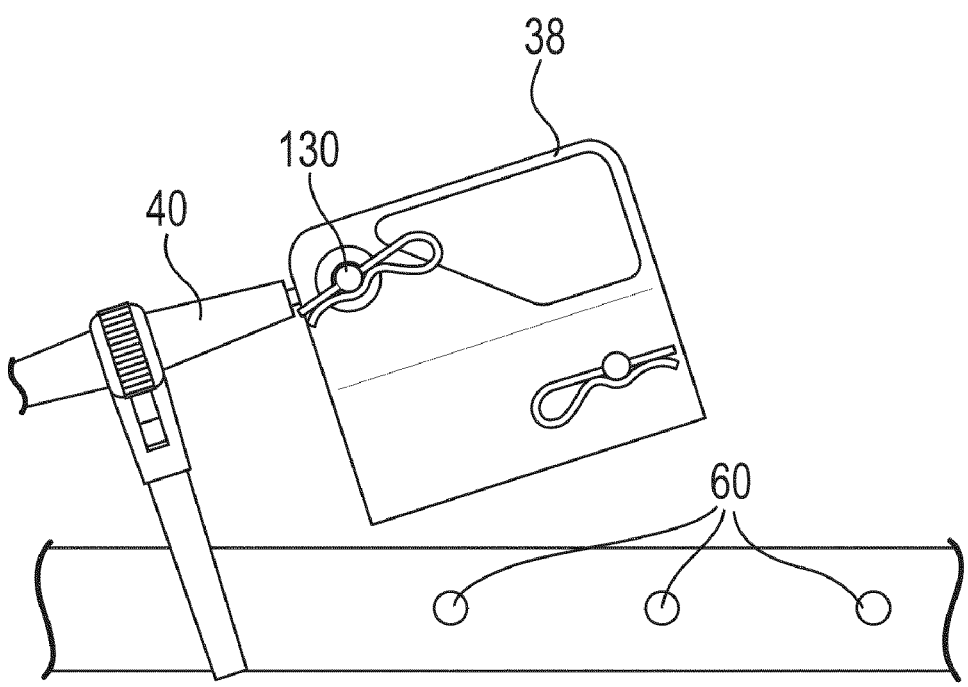
FIG. 9 illustrates an example of the operation of an anchor bracket assembly of the draft bar assembly of FIG. 1 according to one embodiment.

The operation of portable draft bar assembly 30 is described below by FIGS. 9 and 10, with additional reference as required to FIGS. 1 through 7 above. FIG. 9 is a perspective view illustrating the adjustment of anchor bracket assembly 38 along main bar 34. FIG. 10 is a perspective view illustrating one embodiment of portable draft bar assembly 30 mounted on an example bucket 48.

As described above, portable draft bar assembly 30 is configured for temporary or detachable mounting to a bucket 48, such as that of a skid steer for example. In operation, after end bracket 32 is welded, bolted, or otherwise attached to a bucket 40, main bar 34 is coupled or "pinned" to end bracket 32 (see FIGS. 5A and 5B).

Subsequently, referring to FIG. 9, with binder assembly 40 coupled between edge clamp assembly 36 and anchor bracket assembly 38, anchor bracket assembly is moved along main bar 36 until wedge-shaped channels 84 and 86 of edge clamp assembly 36 engage a front or cutting edge 134 of bucket 48 (see FIG. 10). Anchor bracket assembly 38 is then coupled to main bar 34 by inserting saddle pin 102 through aperture 100 of anchor bracket assembly 38 and one of the apertures of the set of apertures or adjustment points 60 of main bar 34 (see FIG. 4). In this fashion, a longitudinal position of edge clamp assembly 36 and anchor bracket assembly 38 along main bar 34 can quickly and easily adjusted by selecting the appropriate adjustment point 60 in which to install saddle pin 102.

Binder assembly 40 is then employed, via a ratchet handle 118, which provides a mechanical advantage to a user, to draw edge clamp assembly 36 along main bar 34 toward anchor saddle 38 such that wedge-shaped channel 84 is pulled tightly against and securely engages cutting edge 134 of bucket 48. It is noted that wedge-shaped configuration of channel 84 provides sufficient clearance to slide and fit over various protrusions often present on the cutting edges of buckets, such as weld joints, bolts, and other hardware used to mount various bucket accessories, such as "ripping" teeth, for example. The wedge-shaped nature of channel 84 enables edge clamp channel 84 to ride up and over such protrusions so as to fully receive the cutting edge of the bucket and stop the movement of edge clamp assembly 36 along main bar 34 by binder assembly 40.

In one embodiment, the sets of apertures or adjustment points 60 on main bar 34 provide an 8-inch range of rough adjustment of the longitudinal positions of end clamp assembly 36 and anchor bracket assembly 38 along main bar 34. In one embodiment, together with the 5-inch range of fine adjustment provided by binder assembly 40, as described above, draft bar assembly 30 provides a 13-inch range of adjustment for end clamp assembly 36, thereby enabling draft bar assembly 30 to be employed on a wide variety of sizes and types of buckets.

Once installed on the bucket of the skid steer (or other machinery on which such a bucket may be mounted), the skid steer can move various items, such as trailers, for example, via various hitch attachments installed within receiver end 52 of main bar 34. With reference to FIG. 10, a multiple ball-type hitch 64 is mounted within receiver end 52 of main bar 34 for attachment to a hitch assembly 138 of a trailer. A skid steer or other piece of equipment to which bucket 48 is attaches is able to move the trailer to a desired location using draft bar assembly 30. In one embodiment, it is noted that draft bar assembly 30 enables a piece of equipment, such as a skid steer, to lift any trailer having a tongue wait not exceeding the designed lifting range of the skid steer. In other words, the capacity of draft bar assembly 30 will not be the limiting factor for the tongue weights of trailers to be moved by a skid steer employing draft bar assembly 30.

Additionally, as described above, with the exception of the attachment of end bracket 32, draft bar assembly 30, according to embodiments of the present invention, can be readily attached to a given bucket without the use of additional tools and in a quick and easy fashion. To remove draft bar assembly 30, the process is simply reversed; thereby, allowing the skid steer, or other machinery item, to be returned to its original configuration and resume its primary purpose, such as loading, grading and excavating, for example.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A portable draft bar assembly comprising:
   an end bracket configured to be mounted to a plurality of bucket attachment types of various machinery;
   a main bar having a first end configured to be selectively coupled to the end bracket and a second end configured to receive and retain one of a plurality of hitch assembly types;
   an anchor bracket configured to be selectively coupled to the main bar at one of a plurality of positions;
   an end clamp slideably coupled to the main bar between second end and the anchor bracket, and including an angled channel; and
   a binder assembly coupled between the anchor bracket and end clamp, wherein the anchor bracket is selectively coupled to a selected one of the plurality of positions so that the angled channel at least partially engages a leading edge of a bucket to which the end bracket is mounted, and wherein the binder assembly is configured to draw the end clamp and anchor bracket together to wedge and secure the angled channel against the leading edge of the bucket.

2. The assembly of claim 1, wherein the binder assembly comprises a load binder ratchet including:
   a ratchet assembly having a gear mechanism and a ratchet handle; and
   a pair of eyebolts, one coupled between the gear mechanism and the anchor bracket and the other coupled between the gear mechanism and the end clamp, wherein actuation of the ratchet handle in a first direction draws the pair of eyebolts together, thereby drawing the end clamp and anchor bracket together and actuation of the ratchet handle in a second direction opposite the first direction pushes the pair of eyebolts apart.

3. The assembly of claim 1, wherein the eyebolts can be adjusted over a desired range.

4. The assembly of claim 1, wherein the desired range comprises a five inch range.

5. The assembly of claim 1, wherein the end bracket is permanently attached to a bucket.

6. The assembly of claim 1, wherein the end bracket is selectively coupled to a bucket.

7. The assembly of claim 1, wherein the main bar comprises rectangular steel tubing.

8. The assembly of claim 1, wherein the main bar includes a plurality of sets of apertures along a portion of its length, each set of apertures corresponding to one of the plurality of positions at which the anchor bracket is configured to be coupled.

9. The assembly of claim 8, wherein the plurality of sets of apertures are spaced at equal intervals and provide the anchor bracket with a desired adjustment range along the main bar.

10. The assembly of claim 9, wherein the desired range comprises eight inches.

11. The assembly of claim 8, wherein the anchor bracket includes a U-shaped saddle portion configured engage and slide along the main bar, and wherein the saddle portion includes a pair of apertures configured to align with the sets of apertures along the main bar and further includes an anchor pin configured to slideably insert through the pair of apertures and a selected one of the sets of apertures along the main bar to secure the anchor bracket to the main bar.

12. The assembly of claim 8, wherein the anchor bracket includes a sleeve configured to receive and slide along the main bar, and wherein the sleeve includes a pair of apertures configured to align with the sets of apertures along the main bar and further includes an anchor pin configured to slideably insert through the pair of apertures and a selected one of the sets of apertures along the main bar to secure the anchor bracket to the main bar.

13. The assembly of claim 1, wherein the end clamp includes a sleeve configured to receive and slide along the main bar.

14. The assembly of claim 1, wherein the end clamp includes a pair of flanges, each flange including a wedge-shaped channel which together form the angled channel.

15. The assembly of claim 1, wherein the end clamp includes a pair of safety chain attachment points.

16. The assembly of claim 1, wherein the second end of the main bar includes an aperture configured to align with an aperture in a hitch attachment received therein, and wherein an attachment pin is configured to slideably insert through the aperture in the second end and through the aperture in the hitch attachment so as to secure the hinge attachment to the main bar.

17. The assembly of claim 1, wherein the second end is configured to receive standard two-inch by two-inch hitch attachments.

* * * * *